United States Patent [19]

Bingler

[11] 4,227,409
[45] Oct. 14, 1980

[54] FLOWMETER

[75] Inventor: Douglas J. Bingler, Furlong, Pa.

[73] Assignee: Milton Roy Company, Ivyland, Pa.

[21] Appl. No.: 3,073

[22] Filed: Jan. 12, 1979

[51] Int. Cl.³ ............................................. G01F 1/28
[52] U.S. Cl. .............................................. 73/861.71
[58] Field of Search ............................... 73/228, 209

[56] References Cited

U.S. PATENT DOCUMENTS

| | | | |
|---|---|---|---|
| 3,224,270 | 12/1965 | Karol | 73/228 |
| 3,490,284 | 1/1970 | Engelhardt | 73/209 |

FOREIGN PATENT DOCUMENTS 381897  5/1973  U.S.S.R. .................................. 73/228

OTHER PUBLICATIONS

Fluid Mechanics; Binder, 2nd Edition, 1949, pp. 142, 143.
University Physics; Sears and Zemansky, copyright 1955, copy in CP4-7B02; pp. 637-640.

*Primary Examiner*—Gerald Goldberg
*Assistant Examiner*—Denis E. Corr
*Attorney, Agent, or Firm*—Woodcock, Washburn, Kurtz, Mackiewicz & Norris

[57] ABSTRACT

An improved flowmeter is disclosed which comprises a fixed magnetic ring at one end of a cylindrical tube and a second magnetic ring disposed within the tube adapted to slide freely therein, and being moved by the fluid to be measured. The opposing magnets exert a repulsive force on one another which is balanced by the fluid flow; the position of the movable magnet provides an indication of the quantity of flow.

5 Claims, 4 Drawing Figures

FLOWMETER

BACKGROUND OF THE INVENTION

The prior art discloses a large number of types of apparatus for measuring the quantity of flow of a liquid. One such instrument which is very popular and which has been quite successfully adapted to a large variety of uses and conditions is the so-called Rotameter which features a vertical tapered tube in which a free float is adapted to slide. The tube is tapered so that the annular space between the free float and the walls of the tapered tube becomes larger as the float is moved vertically upward within the tube. A comparatively small flow will not require so much space within which to flow as a larger, and hence the float will not be moved so far vertically upwards within the tube by a small flow as by a large. Thus the height of the float is an indication of the quantity of the flow. This type of flowmeter therefore balances the force exerted on the float by the fluid's being forced to travel in an annular path around the float against the force of gravity on the float. Since such flowmeters are ordinarily comparatively short, not more than a few feet long, the force of gravity is essentially constant over the length of the flowmeter. Therefore, the tube must be tapered in order that the net force on the float can change with its movement. If the tube were straight, the float would simply go straight to the top of the tube and remain there, thus not providing useful information.

This type of flowmeter is not without utility and, as mentioned above, has been quite widely used in the prior art. However, one difficulty with it is that it is somewhat expensive to make due to the fact that the tube must be tapered. Clearly it would be desirable to provide a flowmeter which did not require such a tapered tube to make, straight tubes being far more readily formed.

OBJECTS OF THE INVENTION

It is therefore an object of the invention to provide an improved flowmeter.

A further object of the invention is to provide a flowmeter which does not require a tapered tube.

Still a further object is to provide a less expensive flowmeter.

SUMMARY OF THE INVENTION

The flowmeter of the present invention obviates the difficulty of the tapered flowmeter discussed above, and satisfies the objects of the invention mentioned above, by its provision of a magnetic "float" and a stationary magnet. Desirably, these magnets are ring shaped and are disposed in a straight (i.e. untapered) tube with their similar magnetic poles towards one another; that is, a repulsive magnetic force is exerted on each by the other. Thus, the force of gravity in the tapered flowmeter is replaced, according to the invention, by the magnetic force between the magnets. Inasmuch as the magnetic force between any two magnets is an inverse square force—that is, it is inversely dependent on the square of the distance between them—it is not constant over the length of the tube. Therefore, the tube need not be tapered in order that a useful flowmeter can be made.

BRIEF DESCRIPTION OF THE DRAWINGS

The invention will be better understood by referring to the accompanying figures in which.

DETAILED DESCRIPTION OF THE PREFERRED EMBODIMENTS

Figure 1:
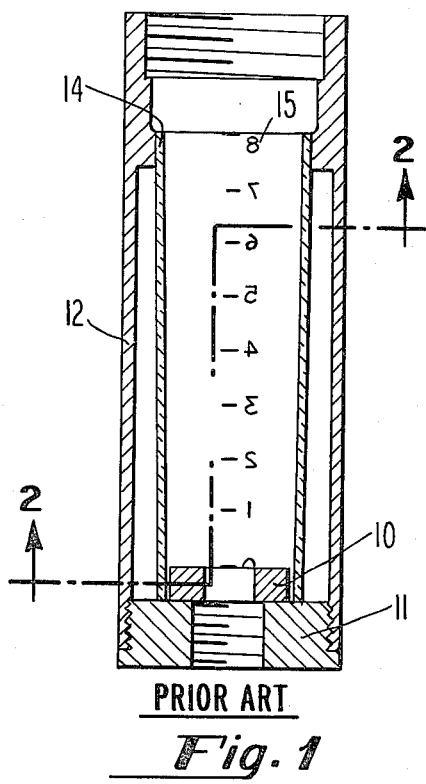
FIGS. 1 and 2 represent orthogonal cross sectional views of the prior art, tapered bore flowmeter.
Figure 2:
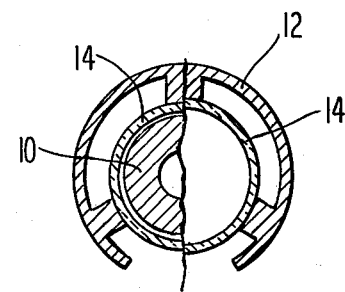

As described above, prior art flowmeters of the type known as "rotameters" have been made of tapered tubes. Such a flowmeter is shown in FIGS. 1 and 2. FIG. 1 shows a cross section of the tapered bore flowmeter typical of the prior art in which a tapered transparent tube 14 provided with reference numerals 15 is shown. The reference numerals 15 are shown reversed due to the view chosen. A free float 10, having a center orifice therein, is shown as fitting loosely within the walls of the tapered tube 14. Clearly, the float could be made solid and need not be, for that matter, round. In operation, the fluid to be measured is supplied at the lower end of the tapered tube 14 and is forced to flow upwardly and at least partially around the float 10. By tapering the walls of the tube, the resistance to the flow of the liquid inserted by the float 10 decreases as the fluid pushes the float 10 up the tapered tube 17, so that the float 10 rises to a point where the force exerted on the float 10 by the fluid passing around it is just equal to the force of gravity on the float 10. Thus, the flowrate can be read off by comparing the position of the float 10 with the reference numeral 15. The tube is shown mounted in a housing 12 with threaded ends for convenient attachment to a conventional pipe. The housing 12 may be adapted as shown to engage a threaded plug 11 for ready assembly.

FIG. 2 shows two half sections of the tapered bore flowmeter of FIG. 1. There, the tapered tube 14 is shown, as is the float 10 and the housing 12. It will be observed that the tube tapers considerably from the upper end of the figure to the lower. In practice, this taper is quite small, on the order of only a few degrees, and is commonly not visible to the naked eye. It has been drawn somewhat exaggerated for purposes of clarity as might be the case, for example, if the flowmeter were to be used with a highly viscous fluid.

Figure 3:
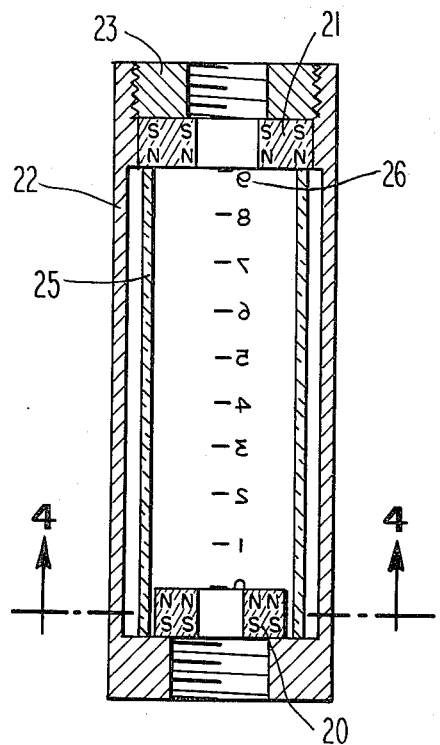
FIGS. 3 and 4 represent corresponding cross sections of the flowmeter of the invention.
Figure 4:
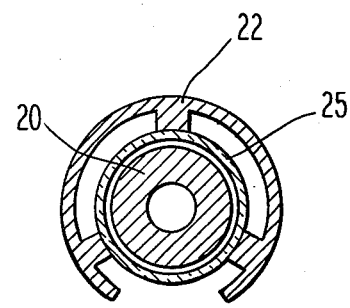

FIGS. 3 and 4 show the improved straight bore flowmeter of the invention. There, a housing 22 contains a transparent tube with straight walls 25 provided with reference numerals 26. The float 20 is made of a magnetic material and is opposed in its rise through the tube due to the force exerted on it by a similar magnet 21 held at the top of the tube. The two magnets 20 and 21 are positioned such that common magnetic poles of the two magnets are opposing each other, as is shown by the indications N and S on the magnets 20 and 21. It being well known that common magnetic poles oppose each other with a force inversely dependent on the square of the distance between them (i.e. an inverse square force) it will be clear that the increased force exerted on the float 20 by an increase in the quantity of fluid passing therethrough and therearound will be opposed by the increasing magnetic force exerted on float 20 by magnetic ring 21 as the float 20 rises in the tube. Thus, the tube need not be tapered to provide a gradient in force on the float. Advantageously, the housing 22 may be provided with a threaded ring 23 to allow assembly of the flowmeter, and the housing 22 may be threaded for engagement with connecting pipes as was discussed above in connection with FIG. 1.

FIG. 4 shows a cross section through the flowmeter of the invention showing housing 22, magnetic float 20, and transparent tube 25.

It will be appreciated by those skilled in the art that the magnetic flow meter of the invention can be made readily and economically, inasmuch as it does not require the manufacture of a tapered tube. This allows the use of standard straight transparent glass or plastic tubing. Alternatively, the flowmeter can be made using a tube of any material, transparent or not, and be provided with electromagnetic means to indicate the position of the magnetic ring within the tube.

It will be appreciated that, unlike the tapered bore flowmeter, which can only be used in a vertical position so that the force of gravity can act on the float, the flowmeter of the invention can be used in any position whatever, depending on the particular fluid system within which it is to operate. It will be furthermore appreciated by those skilled in the art that throughout the specification and the claims appended hereto the term "fluid" is to be construed as including gases within its ambit. Operation of such a flowmeter, either that of the invention or of the prior art tapered bore type as discussed above is identical whether the fluid is a liquid or a gas. Finally, it will be appreciated that there are numerous modifications which can be made to the flowmeter of the invention without departing from the essential scope of the invention. For example, the float need not be round, may or may not have an orifice or orifices within it, and the reference numerals may be on a partially logarithmic scale due to the inverse square nature of the magnetic repulsion between magnetic ring 21 and the float 20. The housing can, of course, be provided in any convenient form for mounting and for connection to other parts of the fluid system, and so forth. As discussed above, the tube in which the magnetic float operates need not be transparent, and provided with reference marks 26, but could be opaque, thus necessitating electromagnetic means to sense the position of the magnetic float within the tube.

Thus, it will be clear that the scope of the present invention is not to be determined by the examples given in the specification, but only by the spirit and scope of the claims appended hereto.

I claim:

1. Apparatus for measuring the flow of a fluid through an untapered straight section of tube, the flow of said fluid through said apparatus being substantially linear, comprising:
    a magnet being disposed within said tube at an end thereof and fixed with respect thereto and a magnet disposed within said tube and adapted to be moved along the axis of said tube from a rest position at an end of said tube in response to fluid passing through said tube, whereby said movable magnet moves a distance from its rest position under the influence of a flow of fluid through said tube such that the force exerted on said movable magnet by said fluid is equal to the force exerted on said movable magnet by said stationary magnet.

2. Apparatus as claimed in claim 1 wherein said movable magnet is of annular shape.

3. Apparatus as claimed in claim 1 where said tube is transparent and is provided with reference indicia to provide a relative indication of the position of said movable magnet.

4. Method for measuring the substantially linear flow of a fluid within an untapered straight section of tube comprising the steps of mounting a magnet firmly within said tube at one end of said section of said tube, adapting a second magnet disposed within said tube to move from a rest position at an end of said tube in response to the flow of fluid through said tube, such that the distance said movable magnet moves is that distance at which the force exerted on said movable magnet by said fluid is equal to the force exerted on said movable magnet by said mounted magnet, and noting the position of said movable magnet with respect to said fixed magnet.

5. Method for measuring the flow of a fluid within a tube as claimed in claim 4 wherein the step of noting the position of the movable magnet with respect to the fixed magnet is done by visually comparing the position of the movable magnet with a series of reference characters positioned on said tube, said tube being transparent.

* * * * *